United States Patent [19]

Busch

[11] 3,731,861

[45] May 8, 1973

[54] METHOD FOR DICING MATERIALS HAVING A HEXAGONAL CRYSTAL STRUCTURE

[75] Inventor: Robert Edward Busch, Elizabeth, N.J.

[73] Assignee: RCA Corporation, New York, N.Y.

[22] Filed: Oct. 28, 1971

[21] Appl. No.: 193,529

[52] U.S. Cl. ....................225/2, 125/23 R, 125/30 R, 225/96.5

[51] Int. Cl. ....................B26f 3/00

[58] Field of Search ....................125/30 R, 23 R; 225/2, 96.5

[56] References Cited

UNITED STATES PATENTS 2,858,730 11/1958 Hanson ....................125/30 R X 3,187,739 6/1965 Du Fresne ....................125/23 R

*Primary Examiner*—Frank T. Yost

*Attorney*—G. H. Bruestle

[57] ABSTRACT

A method for dicing materials having a hexagonal crystal structure, in which the C axis of the crystal is oriented parallel to one surface. Two scribe lines are made on the one surface, each perpendicular to the other and one being perpendicular to the C axis. Two additional lines are scribed on the back surface, each being perpendicular to the C axis and lying in a plane which is inclined about 60° to the projection of the one surface scribe line which is likewise perpendicular to the C axis.

2 Claims, 6 Drawing Figures

METHOD FOR DICING MATERIALS HAVING A HEXAGONAL CRYSTAL STRUCTURE

BACKGROUND OF THE INVENTION

The present invention relates to methods for dicing materials having complex crystal structures.

Pure, single crystal alpha-aluminum oxide ( $\alpha$ - $Al_2O_3$), commonly known as sapphire, is widely used in the semiconductor industry as an insulating substrate for hybrid circuits and the like. In order to meet most packaging requirements, the sapphire substrates presently in use are required to be rectangular. However, sapphire has a hexagonal crystal structure, and has not heretofore been easily diced into a rectangular configuration in a predictable manner.

More specifically, sapphire (and all materials having a hexagonal crystal structure) has four major axes which are referred to as the $a_1$, $a_2$, $a_3$ and C axes. The $a_1$, $a_2$ and $a_3$ axes are equal in length, coplanar, and intersect each other at an angle of 60°. The C axis is normal to the intersection of the other three axes. In order to facilitate scribing large sapphire wafers into the small rectangular dimensions required for the applications described above, the large wafers are usually prepared with one of the four axes parallel to a surface of a wafer. Thus, a scribe line on that surface and parallel to that axis provides an "easy break" line; i.e., a line along which the wafer can be easily and consistently broken. However, in this configuration, the three remaining axes do not provide "easy-break" directions which are normal to the first easy break line and which also lie in the plane of the surface. Therefore, even when a second scribe line is made normal to the first easy break line, the wafer consistently breaks along lines which result in a non-rectangular configuration.

THE DRAWING

FIG. 1 is a representation of a hexagonal crystal, identifying the four axes of the crystal;

FIGS. 2*a*, 2*b*, and 2*c* are top plan, side, and bottom views, respectively, of a wafer scribed in accordance with the invention;

FIG. 3 is a magnified partial section of FIG. 2*b* taken along the lines 3—3'; and FIG. 4 is the same section as FIG. 3 taken after the wafer has been stressed and broken.

DETAILED DESCRIPTION

Figure 1:
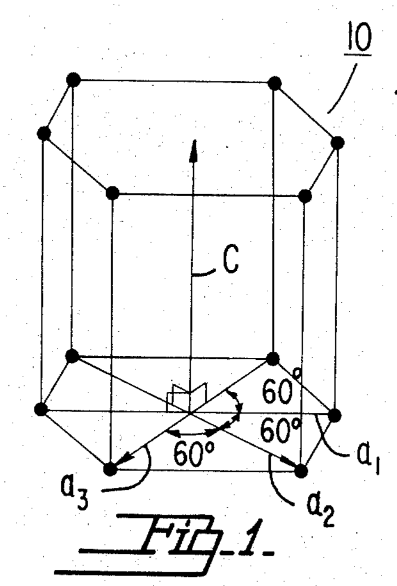

FIG. 1 is a simplified representation of the known structure of a hexagonal crystal 10. The hexagonal crystal 10 has four axes, referred to in FIG. 1 as the $a_1$, $a_2$, $a_3$ and C axes. Three of the axes, $a_1$, $a_2$ and $a_3$ are equal in length, coplanar and intersect each other at an angle of 60°. The fourth (C) axis is normal to the intersection of the $a_1$, $a_2$ and $a_3$ axes. All hexagonal crystals have symmetry about the C axis.

The method of the present invention will be described with reference to FIGS. 2*a–c*, 3 and 4.

Figures 2A, 2B:
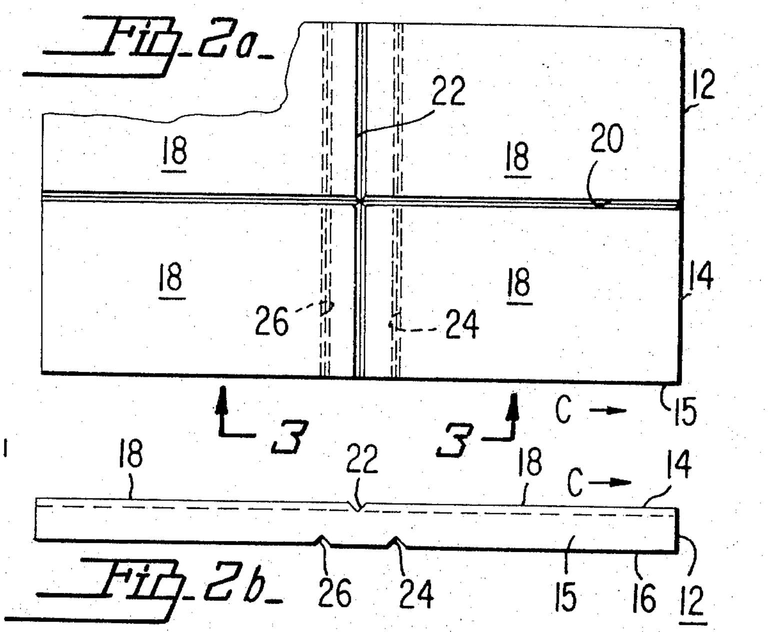
Figure 2C:
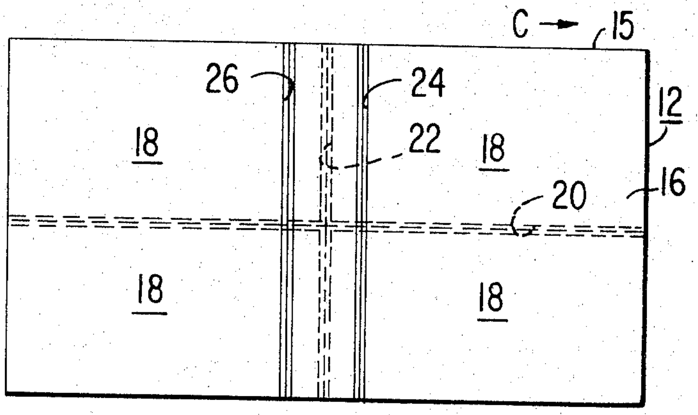

FIGS. 2*a–c* illustrate a wafer 12 of a material having a hexagonal crystal structure, such as sapphire, for example. The wafer 12 has upper and lower opposed surfaces 14 and 16, respectively.

One well known and essential step has preceded the step shown in FIGS. 2*a–c*. This step comprises the preparation of the wafer 12 so that the C axis of the monocrystalline wafer 12 is oriented in a plane which is substantially parallel to a reference surface, which is the upper surface 14 in this embodiment. For purposes of this disclosure "substantially parallel" means that the *c* axis does not deviate more than 15° on either side of the plane which is parallel to the reference surface; and preferably, the deviation is maintained within a 10° tolerance. It is also preferred, though not essential, to further prepare the wafer 12 so that the C axis is substantially parallel to at least one edge surface of the wafer 12, as edge surface 15 in FIGS. 2*a–c*. This C axis orientation to the edge surface 15 aids in identifying the C axis for further processing. Hexagonal crystal wafers having this particular C axis orientation can be readily purchased from a number of vendors. For example, sapphire wafers having this C axis orientation can be purchased from Adolf Meller Company of Providence, Rhode Island. The dimensions of the wafer 12 are not critical. By way of example, sapphire wafers which are 0.750 inches wide, 1.00 inch long and 0.006 inches thick have been readily scribed by the method set out below.

The wafer 12 of FIGS. 2*a–c* is to be diced into four equal rectangular members 18. It will be understood, however, that the wafer 12 can be separated into a larger number of smaller wafers by using additional sets of the particular scribe lines described below.

Figure 3:
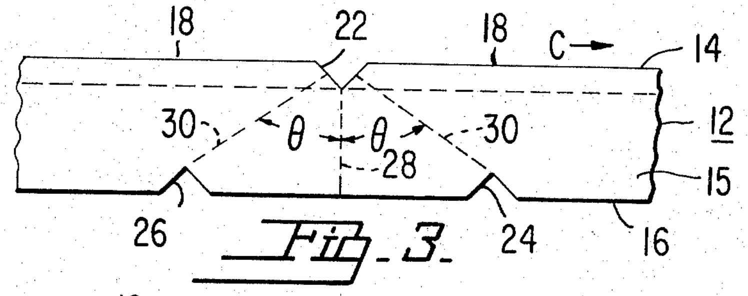

As shown in FIGS. 2*a–c* and magnified in FIG. 3, the wafer 12 is provided with two scribe lines on the upper surface 14. One of the upper surface scribe lines, numbered 20 in FIGS. 2*a* and 2*c*, extends across the upper surface 14 in the direction of the orientation of the C axis. The second upper surface scribe line 22 extends perpendicular to the other upper surface scribe line 20. In order to achieve the desired rectangular configuration, two additional scribe lines, identified as 24 and 26, are scribed on the lower surface 16. As more clearly shown in FIG. 3, the two lower surface scribe lines 24 and 26 are formed on opposing sides of the projection 28 of the upper surface scribe line 22 which is perpendicular to the direction of C axis orientation. Thus, the lower surface scribe lines 24 and 26 are also perpendicular to the c axis orientation. Further, the two lower surface scribe lines 24 and 26 lie in a plane 30 (identified by dotted lines in FIG. 3) which is inclined at an angle $\theta$ from the projection 28 of the upper surface scribe line 22. The angle $\theta$ is about 60°. As can be appreciated, an exact angular measurement is difficult when small thickness dimensions are involved; but a relatively close approximation to 60° is desirable in order to achieve a high yield of rectangular-shaped members.

Figure 4:
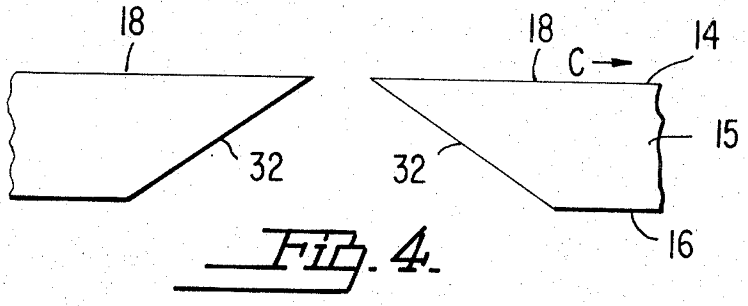

Subsequent to the scribing of the four scribe lines 20, 22, 24 and 26, the wafer 12 is stressed in the customary manner at either the upper or lower surface 14 or 16. The wafer 12 then separates into the rectangular members 18 along the scribe lines 20 and 22 on the upper surface 14. In addition, as shown in FIG. 4, a slight bevel 32 is achieved along one edge of each member 18, the bevel 32 closely approximating the inclined plane 30 of FIG. 3. Rectangular sapphire substrates for electronic circuit use have been diced from large sapphire wafers in accordance with the above described method, and have achieved yields (useable product) closely approaching 100 percent. Prior art techniques for dicing rectangular members from sapphire wafers have had average yields of about 35 percent.

I claim:

1. A method for dicing a body of a material having a hexagonal crystal structure and two opposed surfaces, in which each crystal in the body has four axes, with three of the axes being coplanar and intersecting each other at an angle of 60°, and the fourth axis being normal to the intersection of the first three axis and being in a plane substantially parallel to a first one of said two surfaces, said method comprising the following steps:

a. forming a scribe line on said first surface in a direction substantially parallel to said fourth axis;

b. forming another scribe line on said first surface in a direction perpendicular to said scribe line which is substantially parallel to said fourth axis;

c. forming two scribe lines on the second one of said two surfaces, each on opposing sides of the projection of said another scribe line on said second surface, each said second surface scribe line lying in a plane which is inclined at about 60° from the projection of said another scribe line; and d. stressing one of said surfaces to separate said body into rectangular members along said scribe lines.

2. A method according to claim 1, wherein said body consists of sapphire.

* * * * *